United States Patent
Hirano

(10) Patent No.: US 9,930,219 B2
(45) Date of Patent: Mar. 27, 2018

(54) PROFILE CREATION METHOD AND COMPUTER READABLE RECORDING MEDIUM STORED WITH PROFILE CREATION PROGRAM

(71) Applicant: Konica Minolta, Inc., Chiyoda-ku, Tokyo (JP)

(72) Inventor: Sachiko Hirano, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/729,115

(22) Filed: Jun. 3, 2015

(65) Prior Publication Data
US 2015/0358506 A1    Dec. 10, 2015

(30) Foreign Application Priority Data
Jun. 6, 2014    (JP) .................. 2014-117736

(51) Int. Cl.
H04N 1/60 (2006.01)
G06K 15/12 (2006.01)
G06K 15/02 (2006.01)

(52) U.S. Cl.
CPC ......... *H04N 1/6033* (2013.01); *G06K 15/129* (2013.01); *G06K 15/1878* (2013.01); *H04N 1/6041* (2013.01)

(58) Field of Classification Search
None
See application file for complete search history.

(56) References Cited

U.S. PATENT DOCUMENTS

| | | | | |
|---|---|---|---|---|
| 7,952,757 B2 * | 5/2011 | Kaneko | ............... | H04N 1/6033 345/601 |
| 8,072,658 B2 * | 12/2011 | Namikata | ............ | G06T 11/001 358/1.9 |
| 2002/0051131 A1 * | 5/2002 | Ohkubo | ................... | G01J 3/52 356/421 |
| 2006/0007457 A1 | 1/2006 | Namikata | | |

FOREIGN PATENT DOCUMENTS

JP    2013-219522 A    10/2013

OTHER PUBLICATIONS

First Office Action dated Jul. 26, 2017 issued by The State Intellectual Property Office of People's Republic of China in the corresponding Chinese Patent Application No. 201510305412.0 and English translation (12 pages).

* cited by examiner

*Primary Examiner* — Christopher D Wait
(74) *Attorney, Agent, or Firm* — Buchanan Ingersoll & Rooney PC

(57) ABSTRACT

The profile creation method creates a color conversion profile for a printer by causing the printer to output a color chart including patch images having colors corresponding to combinations of values of a plurality of basic colors. The method includes extracting a pair of grid points adjacent to each other from among grid points of a lookup table indicating a correspondence relationship between the values of the colors of the patch images and colorimetric values of the patch images, and performing an interpolation process according to a degree of color variation in two patch images corresponding to the pair of grid points obtained from data of colorimetric values accumulated regarding the two patch images to obtain a grid point for interpolation between the pair of grid points.

16 Claims, 8 Drawing Sheets

| | 0% | 10% | 20% | 30% | 40% | 55% | 70% | 85% | 100% | C |
|---|---|---|---|---|---|---|---|---|---|---|
| 100% | COLORIMETRIC VALUE ACQUIRED | COLORIMETRIC VALUE ACQUIRED | COLORIMETRIC VALUE ACQUIRED | | | | | | | |
| 85% | | | | | | | | | | |
| 70% | COLORIMETRIC VALUE ACQUIRED | | | | COLORIMETRIC VALUE ACQUIRED | | COLORIMETRIC VALUE ACQUIRED | | COLORIMETRIC VALUE ACQUIRED | |
| 55% | | | | | | | | | | |
| 40% | COLORIMETRIC VALUE ACQUIRED | | | | COLORIMETRIC VALUE ACQUIRED | | COLORIMETRIC VALUE ACQUIRED | | COLORIMETRIC VALUE ACQUIRED | |
| 30% | | | | | | | | | | |
| 20% | COLORIMETRIC VALUE ACQUIRED | | | | COLORIMETRIC VALUE ACQUIRED | | COLORIMETRIC VALUE ACQUIRED | | COLORIMETRIC VALUE ACQUIRED | |
| 10% | COLORIMETRIC VALUE ACQUIRED | COLORIMETRIC VALUE ACQUIRED | | | | | | | | |
| 0% | COLORIMETRIC VALUE ACQUIRED | COLORIMETRIC VALUE ACQUIRED | | | COLORIMETRIC VALUE ACQUIRED | | COLORIMETRIC VALUE ACQUIRED | | COLORIMETRIC VALUE ACQUIRED | |

PROFILE CREATION METHOD AND COMPUTER READABLE RECORDING MEDIUM STORED WITH PROFILE CREATION PROGRAM

CROSS-REFERENCE TO RELATED APPLICATION

This application is based on Japanese Patent Application No. 2014-117736 filed on Jun. 6, 2014, the contents of which are incorporated herein by reference.

BACKGROUND

1. Technical Field

The present invention relates to a profile creation method and a computer readable recording medium stored with a profile creation program.

2. Description of Related Art

In creating a printer profile for an electro-photographic printer, the printer is caused to output patch images having colors corresponding to combinations of values of C (cyan), M (magenta), Y (yellow), and K (black) to correlate the CMYK values of the patch images with colorimetric values (such as L*a*b* values) thereof. Since it is difficult to output patch images of all combinations of all values of C, M, Y, and K to perform colorimetry, the printer is usually caused to output a color chart including an array of about several hundreds of patch images. Then, for a color conversion LUT (lookup table) indicating a correspondence relationship between the CMYK values of the patch images and the colorimetric values thereof, a grid-point interpolation process is performed to create a color conversion LUT having a predetermined number of grid points.

With regard to this, Japanese Unexamined Patent Application Publication No. 2013-219522 discloses a technique for creating a color conversion LUT having a predetermined number of grid points by performing an interpolation process using an optimal interpolation method for each grid point selected from among a plurality of interpolation methods. This technique improves interpolation accuracy for the grid points of the color conversion LUT, thus allowing improvement in accuracy of a printer profile created by outputting a color chart.

However, the above technique does not consider the influence of variation in colors (reproducibility) output from a printer. Colors output from a single printer slightly vary per output even in colors of the same CMYK values. In addition, colors output from a plurality of printers slightly vary per printer even in colors of the same CMYK values output from the printers of the same model. The degree of such a color variation per output or per printer varies depending on the color to be output.

Accordingly, under the recent circumstances where achievement of higher precision color management has been desired, there has been a concern that when a printer profile is created on the basis of one sheet of a color chart output by a printer, color variation is picked up, thus creating a rather inappropriate printer profile. When considering color variation per output and color variation per printer, it is preferable for a printer profile to reflect an average value (median value) of color variation.

SUMMARY

The present invention has been accomplished in view of the above problem. Accordingly, objectives of the present invention are to provide a profile creation method that can create a color conversion profile reflecting an average value of color variation by causing a printer to output one sheet of a color chart and a computer readable recording medium stored with a profile creation program.

To achieve at least one of the above-mentioned objectives, a profile creation method reflecting one aspect of the present invention is a profile creation method for creating a color conversion profile for a printer by causing the printer to output a color chart including patch images having colors corresponding to combinations of values of a plurality of basic colors, the method comprising the steps of: (a) extracting a pair of grid points adjacent to each other from among grid points of a lookup table indicating a correspondence relationship between the values of the colors of the patch images and colorimetric values of the patch images; and (b) performing an interpolation process according to a degree of color variation in two patch images corresponding to the pair of grid points obtained from data of colorimetric values accumulated regarding the two patch images to obtain a grid point for interpolation between the pair of grid points.

In the profile creation method, preferably, the interpolation process is a process involving an interpolation calculation using a plurality of grid points, and a number of the plurality of grid points for use in the interpolation calculation is changed according to the degree of the variation so that as the degree of the variation is larger, the number of the plurality of grid points increases.

In the profile creation method, preferably, the interpolation process is a process for calculating a weighted average value between a first approximate value calculated by a linear interpolation calculation using a plurality of grid points and a second approximate value calculated by a polynomial interpolation calculation using a plurality of grid points, and a weighting factor for use in the calculation of the weighted average value is changed according to the degree of the variation so that as the degree of the variation is larger, a weight of the first approximate value becomes larger.

The profile creation method preferably further comprises the steps of, before the step (b): (c) calculating, from the data of the colorimetric value, standard deviations of L* value, a* value, and b* value of the colorimetric value in an L*a*b* color system, and (d) obtaining the degree of the variation on the basis of the standard deviations.

In the profile creation method, preferably, the step (a) and the step (b) are executed regarding a plurality of pairs of grid points included in the lookup table, and regarding the plurality of pairs of grid points, the interpolation process is performed in a sequential order of pairs of grid points corresponding to ridgelines, pairs of grid points corresponding to a surface other than the ridgelines, and pairs of grid points corresponding to an inside of a color space whose axis variables are represented by the basic colors.

In the profile creation method, preferably, regarding the pairs of grid points for which the interpolation process is performed at a same priority level of the sequential order, the interpolation process is performed preferentially starting from a pair of grid points included in an array of grid points where a value of a basic color whose monochromatic solid image has lower brightness gradually changes.

The objectives, features, and characteristics of this invention other than those set forth above will become apparent from the description given herein below with reference to preferred embodiments illustrated in the accompanying drawings.

BRIEF DESCRIPTION OF THE DRAWINGS

FIG. 9 is a diagram for illustrating an interpolation process of grid points.

DETAILED DESCRIPTION

Hereinafter, preferred embodiments of the present invention will be described in detail with reference to the accompanying drawings.

Figure 1:
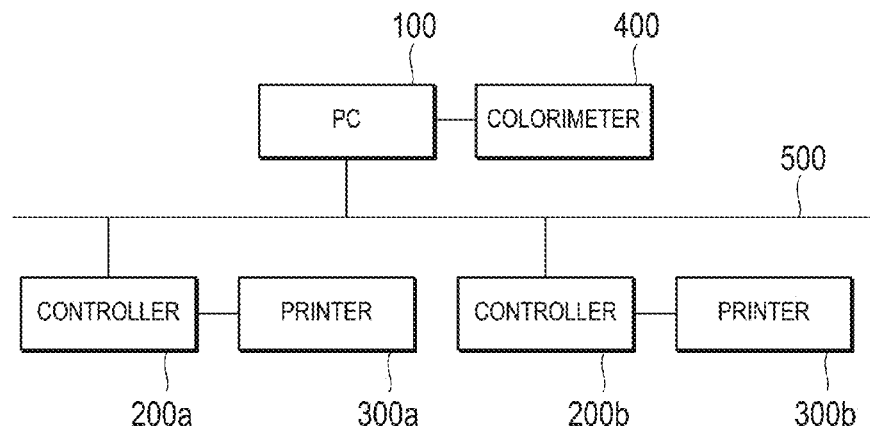
FIG. 1 is a block diagram showing a whole structure of a print system to which a profile creation method according to an embodiment of the present invention is applied.

FIG. 1 is a block diagram showing a whole structure of a print system to which a profile creation method according to an embodiment of the present invention is applied.

As shown in FIG. 1, the print system includes a PC (personal computer) 100, controllers 200a and 200b, printers 300a and 300b, and a colorimeter 400. The PC 100 is communicably connected to the controllers 200a and 200b via a network 500. The controllers 200a and 200b, respectively, are connected to the printers 300a and 300b, respectively, for example, via an exclusive interface bus such as an IEEE 1394 serious bus or a USB (universal serial bus). The PC 100 is connected to the colorimeter 400 via an exclusive line. The controllers 200a and 200b are controllers of the same model, and the printers 300a and 300b are printers of the same model.

The network 500 is a LAN (local area network) connecting computers or network devices to each other by a standard such as Ethernet, FDDI (fiber distributed data interface), or Wi-Fi (wireless fidelity), a WAN (wide area network) connecting LANs to each other by an exclusive line, or the like. The kinds and numbers of the devices connected to the network 500 are not limited to those in the example shown in FIG. 1.

Figure 2:
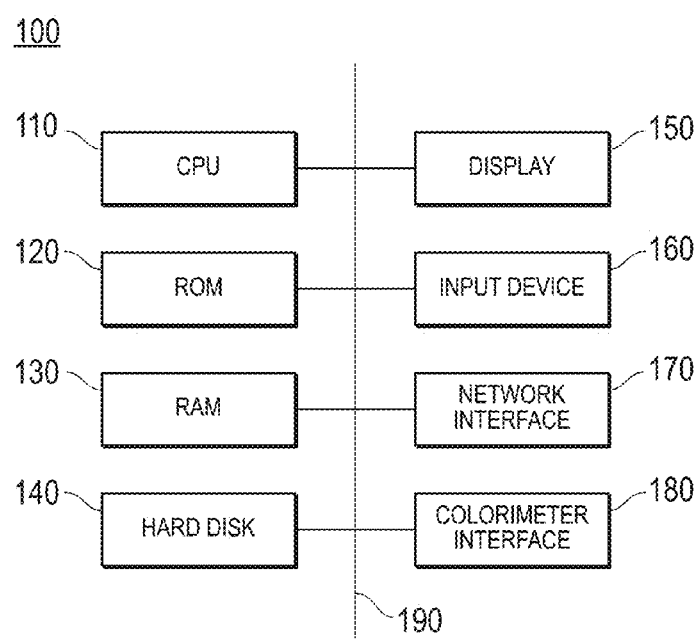
FIG. 2 is a block diagram showing a schematic structure of a PC.

FIG. 2 is a block diagram showing a schematic structure of the PC 100. The PC 100 includes a CPU (central processing unit) 110, a ROM (read only memory) 120, a RAM (random access memory) 130, a hard disk 140, a display 150, an input device 160, a network interface. 170, and a colorimeter interface 180, which are connected to each other via a bus 190 for receiving and transmitting signals.

The CPU 110 controls the above respective units and performs various kinds of calculation processes according to programs. The ROM 120 stores various kinds of programs and various kinds of data. The RAM 130 as a work area temporarily stores a program and data. The hard disk 140 stores various kinds of programs including an operating system (OS) and various kinds of data.

The display 150 is, for example, a liquid crystal display and displays various kinds of information. The input device 160 includes a pointing device such as a mouse and a keyboard and is used to perform various kinds of inputting operations. The network interface 170 is an interface for communicating with other devices via the network 500, and a standard such as Ethernet, FDDI, or Wi-Fi is used.

The colorimeter interface 180 is an interface for communicating with the locally connected colorimeter 400. The colorimeter 400 is, for example, a spectrophotometer provided with three kinds of sensors corresponding to the three primary colors of light: red, green, and blue and a spectroscopic sensor for performing colorimetry on the basis of output values (RGB values) from the three kinds of sensors with respect to respective parts of a color image.

Figure 3:
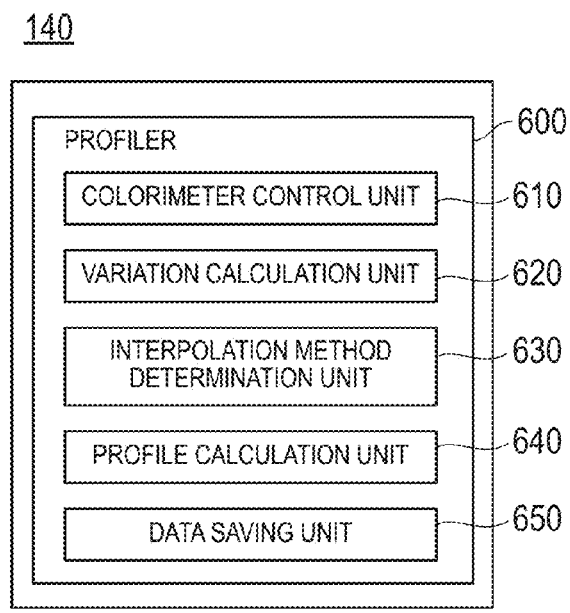
FIG. 3 is a block diagram showing storage contents of a hard disk of the PC.

FIG. 3 is a block diagram showing storage contents of the hard disk 140 of the PC 100.

The hard disk 140 of the PC 100 stores a profiler 600 as a profile creation program. The profiler 600 includes programs corresponding to a colorimeter control unit 610, a variation calculation unit 620, an interpolation method determination unit 630, a profile calculation unit 640, and a data saving unit 650.

The colorimeter control unit 610 controls operation of the colorimeter 400. The variation calculation unit 620 calculates a degree of color variation in each patch image from data of colorimetric value accumulated regarding the each patch image. The interpolation method determination unit 630 determines an interpolation calculation method for interpolating grid points of a color conversion LUT that indicates a correspondence relationship between CMYK values of each patch image and colorimetric values thereof, according to the degree of color variation in the each patch image. The profile calculation unit 640 creates a printer profile by interpolating the grid points of the color conversion LUT. The data saving unit 650 stores data such as colorimetric values. The functions of the colorimeter control unit 610, the variation calculation unit 620, the interpolation method determination unit 630, the profile calculation unit 640, and the data saving unit 650 are exerted through the executions of programs corresponding to the respective functions by the CPU 110.

Figure 4:
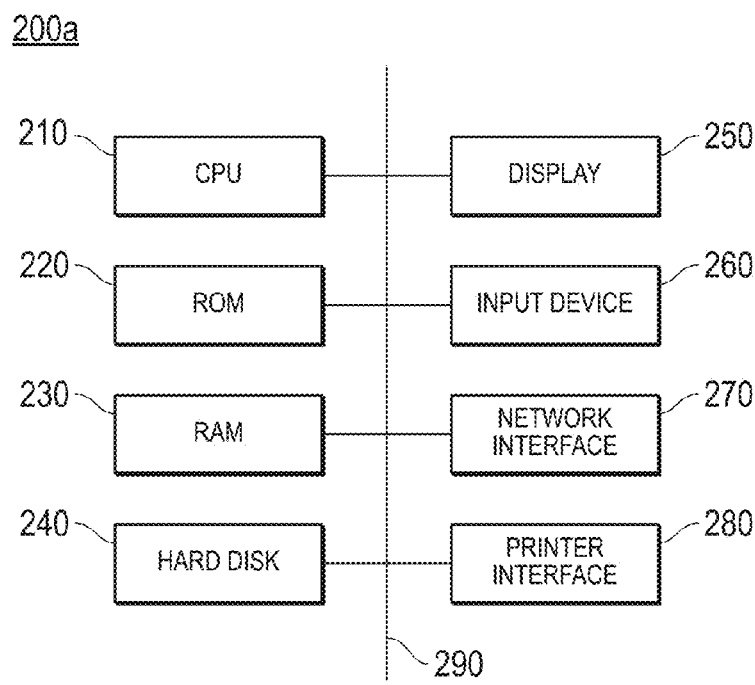
FIG. 4 is a block diagram showing a schematic structure of a controller.

FIG. 4 is a block diagram showing a schematic structure of the controllers 200a and 200b. Since the controllers 200a and 200b are controllers of the same model, the controller 200a will be described as a representative one hereinbelow.

The controller 200a includes a CPU 210, a ROM 220, a RAM 230, a hard disk 240, a display 250, an input device 260, a network interface 270, and a printer interface 280, which are connected to each other via a bus 290 for receiving and transmitting signals. Among the above-mentioned respective units of the controller 200a, the units having the same functions as those of the above-described respective units of the PC 100 will not be described.

The printer interface 280 is an interface for communicating with the locally connected printer 300a.

The hard disk 240 stores a color conversion LUT of an ICC (International Color Consortium) printer profile or the like. Additionally, the hard disk 240 stores a RIP process program for converting CMYK values of each pixel by using the color conversion LUT while developing print data described in a page description language into bit map image data.

Figure 5:
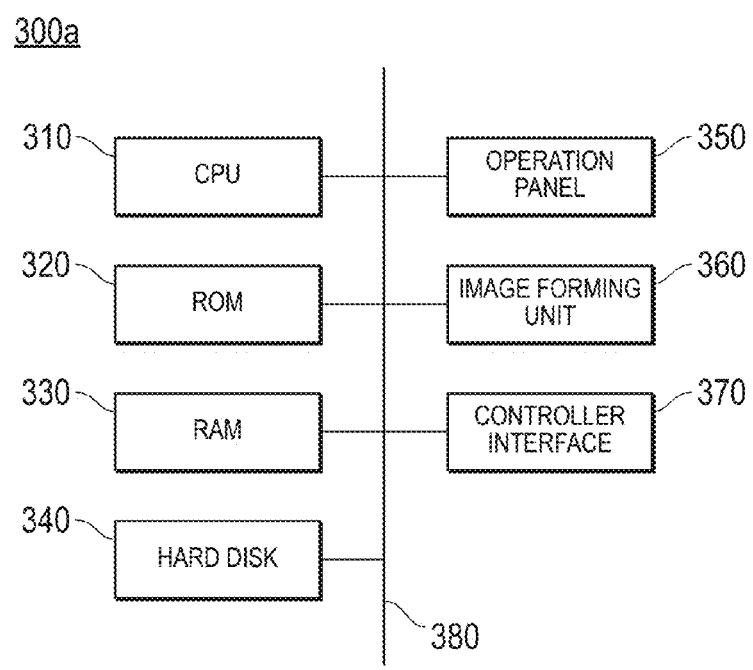
FIG. 5 is a block diagram showing a schematic structure of a printer.

FIG. 5 is a block diagram showing a schematic structure of the printers 300a and 300b. Since the printers 300a and 300b are printers of the same model, the printer 300a will be described as a representative one hereinbelow.

The printer 300a includes a CPU 310, a ROM 320, a RAM 330, a hard disk 340, an operation panel 350, an image forming unit 360, and a controller interface 370, which are connected to each other via a bus 380 for receiving and transmitting signals. Among the above-mentioned respective units of the printer 300a, the units having the same functions as those of the above-described respective units of the PC 100 will not be described.

The operation panel 350 is used to display various kinds of information and input various kinds of commands. The image forming unit 360 forms an image based on image data received from the controller 200a on a record sheet such as paper by using a known image forming process such as an electro-photographic process. The image forming unit 360 forms an image using toners of four basic colors: C, M, Y, and K.

The controller interface 370 is an interface for communicating with the locally connected controller 200a.

The PC 100, the controllers 200a and 200b, and the printers 300a and 300b may include elements other than the above-described elements or may omit some of the above-described elements.

In the print system thus configured, a printer profile is created by causing a printer to output a color chart and correlating CMYK values of each patch image with colorimetric values thereof. Hereinafter, a description will be given of operation of the print system according to the present embodiment with reference to FIGS. 6 to 12. The following description illustrates an exemplary case of creation of a printer profile reflecting color variation per printer output.

Figure 6:
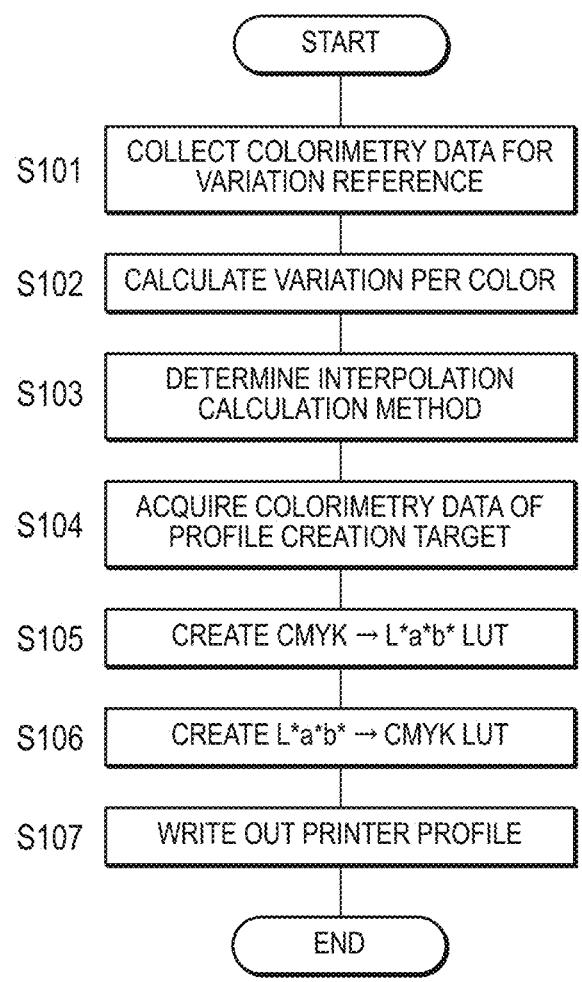
FIG. 6 is a flowchart showing steps of a profile creation process executed by the PC.

FIG. 6 is a flowchart showing steps of a profile creation process executed by the PC 100. The algorithm represented by the flowchart of FIG. 6 is stored as a program in the hard disk 140 of the PC 100 and executed by the CPU 110.

First, the PC 100 collects colorimetry data for variation reference (step S101). Specifically, the PC 100 first transmits a print job to the controller 200a to cause the printer 300a to output a plurality of sheets (for example, 30 sheets) of the same color chart 700 (see FIG. 7). Then, the PC 100 acquires colorimetric values (for example, L*a*b* values) obtained by colorimetry of patch images in the plurality of sheets of the color chart 700 performed by the colorimeter 400 and saves the colorimetric values in the data saving unit 650 of the hard disk 140.

Figure 7:
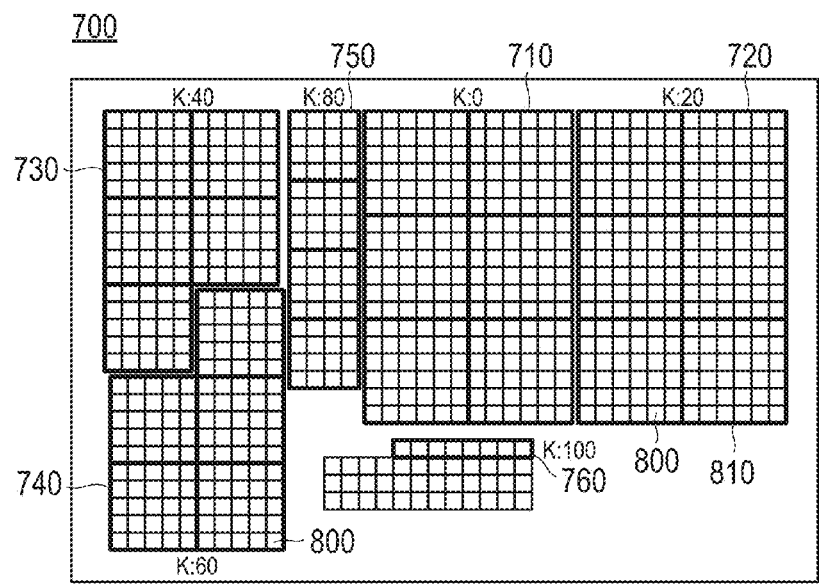
FIG. 7 is a diagram showing an example of a color chart.
Figure 8:
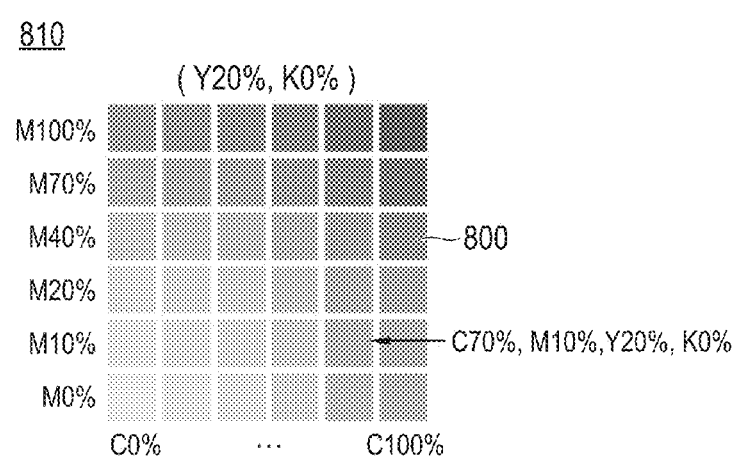
FIG. 8 is a partially enlarged diagram of FIG. 7.

FIG. 7 is a diagram showing an example of the color chart 700, and FIG. 8 is a partially enlarged diagram of FIG. 7. As shown in FIG. 7, the color chart 700 includes patch images 800 having colors corresponding to combinations of CMYK values. In FIG. 7, the patch images 800 in one sheet of the color chart 700 are classified into six patch image groups 710 to 760 by K values (K: 0, 20, 40, 60, 80, and 100%).

Then, the patch image groups 710 and 720 of K: 0% and 20% each include 216 (6×6×6) patch images 800 corresponding to combinations of C, M, and Y each: 0, 10, 20, 40, 70, and 100%. The 216 patch images 800 are classified into six patch image blocks 810 by Y values. Then, as shown in FIG. 8, each patch image block 810 has a structure in which 36 (6×6) patch images 800 are two-dimensionally arranged in such a manner that M value and C value gradually change.

Similarly, the patch image groups 730 and 740 of K: 40% and 60% each include 125 (5×5×5) patch images 800 corresponding to combinations of C, M, and Y each: 0, 20, 40, 70, and 100%. The 125 patch images 800 are classified into five patch image blocks 810 by Y values. In addition, the patch image group 750 of K: 80% includes 64 (4×4×4) patch images 800 corresponding to combinations of C, M, and Y each: 0, 40, 70, and 100%, and the 64 patch images 800 are classified into four patch image blocks 810 by Y values. Additionally, the patch image group 760 of K: 100% includes 8 (2×2×2) patch images 800 corresponding to combinations of C, M, and Y each: 0 and 100%.

As described hereinabove, in the process shown at the step S101, the printer 300a is caused to output, for example, the 30 sheets of the same color chart 700. The 30 sheets of the color chart 700 are preferably output by the printer 300a, while changing environmental temperature and humidity or changing an output condition so that each sheet thereof is a first page output immediately after pausing or one output during continuous operation. Then, all of the patch images 800 in the 30 sheets of the color chart 700 output from the printer 300a are subjected to colorimetry by the colorimeter 400. The PC 100 acquires 30 sets of colorimetric values per patch image and saves data of the colorimetric values in the hard disk 140.

Next, the PC 100 calculates a degree of each color variation (step S102). Specifically, based on the data of the colorimetric values collected by the process shown at the step S101, the PC 100 calculates a degree of variation regarding a color of each patch image (CMYK values) included in the color chart 700.

More specifically, the PC 100 first calculates each of standard deviations of the L*values, the a*values, and the b*values of the 30 sets of colorimetric values regarding the color of each patch image, from the data of the 30 sets of colorimetric values collected per patch image by the process shown at the step S101. Subsequently, the PC 100 weights the standard deviation of the L* values by 0.5 times against the standard deviations of the a* values and the b* values to obtain a sum of the three standard deviations. Then, the PC 100 refers to a predetermined threshold value and, based on the sum of the standard deviations, classifies the degree of each color variation of the patch images 800 into three levels of "a", "b", and "c".

In the present embodiment, when the sum of the standard deviations is less than 1.0, the PC 100 classifies the degree of variation as "a". In addition, when the sum of the standard deviations is not less than 1.0 and less than 3.0, the PC 100 classifies the degree of variation as "b". When the sum of the standard deviations is not less than 3.0, the PC 100 classifies the degree of variation as "c". For example, when all of the standard deviations of the L* values, the a* values, and the b* values of the 30 sets of colorimetric values accumulated regarding one patch image 800 in the color charts 700 are 1, the sum of the standard deviations is 2.5 and the degree of variation is classified as "b". In the calculation of the sum of the standard deviations of the L* values, the a* values, and the b* values, weighting the L* values by a small factor allows accuracy and robustness of the a* values and the b* values to be more improved than the L* values, thereby allowing the creation of a printer profile more excellent in visual color reproducibility.

Next, the PC 100 determines an interpolation calculation method for grid points (step S103). Specifically, the PC 100 determines an interpolation calculation method for use in an interpolation process for the color conversion LUT indicating the correspondence relationship between CMYK values of the patch images and colorimetric values thereof, according to the degree of variation calculated by the process shown at the step S102. More specifically, the PC 100 determines, per pair of grid points of the color conversion LUT, an interpolation calculation method for interpolating grid points of the color conversion LUT in such a manner that smoothness is prioritized in colors with a large degree of variation and reproduction accuracy is prioritized in colors with a small degree of variation.

In the present embodiment, the PC 100 first selects a pair of grid points adjacent to each other from among a plurality of grid points of the color conversion LUT. Next, regarding two patch images corresponding to the selected pair of grid points, the PC 100 classifies the degree of color variation in the two patch images (hereinafter referred to also as "degree of both-side variation") into any of three levels: "A", "B", and "C", from the degree of color variation per patch image calculated by the process shown at the step S102. Then, the PC 100 refers to a conversion table (see Table 1) showing a relationship between degree of both-side variation, number of neighboring points for interpolation calculation, and weighting factor of linear approximate value to determine, per pair of grid points, a number of neighboring points and a weighting factor of linear approximate value to be applied to the interpolation process of grid points, from the degree of both-side variation.

TABLE 1

| Degree of both-side variation | Number of neighboring points | Weight of linear approximate value |
|---|---|---|
| A | 2 | 0.2 |
| B | 4 | 0.5 |
| C | 6 | 0.8 |

Table 1 shows an example of the conversion table showing the relationship between degree of both-side variation, number of neighboring points for interpolation calculation, and weighting factor of linear approximate value. The PC 100 classifies the degree of both-side variation as "A" when the degree of variation in each of the two patch images calculated by the process shown at the step S102 is both "a" or when the degree of variation in one of the two patch images is "a" and the degree of variation in the other one thereof is "b". Additionally, the PC 100 classifies the degree of both-side variation as "B" when the degree of variation in each of the two patch images is both "b" or when the degree of variation in one thereof is "a" and the degree of variation in the other one thereof is "c". The PC 100 classifies the degree of both-side variation as "C" when the degree of variation in each of the two patch images is both "c" or when the degree of variation in one thereof is "b" and the degree of variation in the other one thereof is "c". Then, the PC 100 refers to the Table 1 to determine, per pair of grid points, a number of neighboring points and a weighting factor from the degree of both-side variation so that as the degree of color variation in each patch image is larger, the number of neighboring points increases and the weighting factor of linear approximate value becomes larger.

As described above, in the processes shown at the steps S101 to S103, first, the printer 300a is caused to output the plurality of sheets of the color chart 700 to accumulate the data of the colorimetric values regarding each patch image 800. Then, from the data of the colorimetric values accumulated regarding the each patch image 800, the degree of color variation in each patch image 800 is specified, and an interpolation calculation method corresponding to the degree of color variation is determined per pair of grid points of the color conversion LUT.

Next, the PC 100 acquires colorimetry data of a profile creation target (step S104). Specifically, the PC 100 first transmits a print job to the controller 200b to cause the printer 300b to output one sheet of the color chart 700. Then, the PC 100 acquires colorimetric values (L*a*b* values) obtained by colorimetry of the patch images 800 in the color chart 700 by the colorimeter 400.

Next, the PC 100 creates a CMYK→L*a*b* color conversion LUT (step S105). Specifically, regarding the color conversion LUT indicating the correspondence relationship between the CMYK values of the patch images and the colorimetric values thereof acquired by the process shown at the step S104, the PC 100 performs an interpolation process through the interpolation calculation method determined by the process shown at the step S103 to create a CMYK→L*a*b* color conversion LUT (an A2B table) having a predetermined number of grid points.

In the present embodiment, the PC 100 performs, per pair of grid points of the color conversion LUT, an interpolation process by applying the number of neighboring points and the weighting factor determined by the process shown at the step S103 to obtain grid points for use in interpolation between the pair of grid points. Specifically, the PC 100 first extracts a pair of grid points adjacent to each other from among the plurality of grid points of the color conversion LUT. Next, for a grid point for use in interpolation between the extracted pair of grid points, the PC 100 uses the same number of grid points as the number of neighboring points determined per pair of grid points by the process shown at the step S103 to perform a linear interpolation calculation and a polynomial interpolation calculation, respectively, so as to calculate a first approximate value by the linear interpolation and a second approximate value by the polynomial interpolation, respectively. Then, the PC 100 calculates a weighted average value between the first approximate value and the second approximate value by applying the weighting factor determined per pair of grid points by the process shown at the step S103, so as to calculate color values (L*a*b* values) of the grid point for interpolation between the pair of grid points.

The PC 100 calculates the first and the second approximate values by using the same number of grid points before and after a grid point whose color value is to be obtained. Herein, when there is a shortage of the number of grid points available with respect to the number of neighboring points determined by the process shown at the step S103, the PC 100 calculates the approximate values by adding a grid point located either before or after the grid point whose color value is to be obtained. However, when no grid point is left both therebefore and thereafter, the PC 100 calculates the approximate values by using only the available grid points. For example, when the number of neighboring points determined by the process shown at the step S103 is six and only five grid points in total are left therebefore and thereafter, the PC 100 calculates the approximate values by using the five grid points. The technique itself for calculating the approximate values of the color value of a specific grid point by an interpolation calculation using a plurality of neighboring grid points is a typical interpolation calculation technique, and thus, a detailed description thereof will be omitted. In addition, examples of the polynomial interpolation include Neville interpolation, spline interpolation, Lagrange interpolation, and Newton interpolation.

Furthermore, in the present embodiment, the PC 100 creates a color conversion LUT with 5% increments for each of CMYK by repeating the interpolation process two times. Specifically, as shown in FIG. 9, for example, the PC 100 first performs a first-time interpolation process regarding a grid point group where a specific color value gradually changes, like 0, 10, 20, 40, 70, and 100%, thereby obtaining grid points of 30, 55, and 85%. Then, the PC 100 performs a second-time interpolation process by using the newly obtained grid points to obtain remaining grid points of 5, 15, 25%, etc.

In this case, the PC 100 performs the interpolation process in a sequential order of pairs of grid points corresponding to ridgelines, pairs of grid points corresponding to a surface other than the ridgelines, and pairs of grid points corresponding to an inside in a CMYK color space whose axis variables are represented by CMYK. Specifically, for example, first, regarding each of K: 0, 20, 40, 60, 80, and 100%, the PC 100 performs the interpolation process for the pairs of grid points corresponding to the ridgelines of the CMY color space. Then, similarly, regarding each of K: 0, 20, 40, 60, 80, and 100%, the PC 100 performs the interpolation process for the pairs of grid points corresponding to the surface of the CMY color space. Furthermore, similarly, regarding each of K: 0, 20, 40, 60, 80, and 100%, the PC 100 performs the interpolation process for the pairs of grid points corresponding to the inside of the CMY color space. After that, the PC 100 performs the interpolation process for pairs of grid points of K: 0, 20, 40, 60, 80, and 100%. With this configuration, since the grid points are interpolated sequentially starting from a color estimated to be highly stable in terms of an image forming process, other grid points are interpolated on the basis of grid points that seem to be more accurate. Thus, inappropriate results are rarely obtained.

Furthermore, within each of the categories of the ridgelines, the surface, and the inside of the CMYK color space, preferably, the interpolation process of grid points is preferentially performed for an array of grid points where a value of a basic color whose monochromatic solid image has lower brightness (solid brightness) changes. Specifically, preferably, the interpolation process of grid points is performed, for example, in a priority order of K, C, M, and Y. With this configuration, since grid points are interpolated in a sequential order starting from a color that has a higher contribution to change in color value, continuity in arrays of color values can be easily maintained.

Taking an example of the patch image block 810 shown in FIG. 8, since C has lower solid brightness than M, interpolation is more preferentially performed between a grid point of C 100%, M 100%, Y 20%, and K 0% and a grid point of C 70%, M 100%, Y 20%, and K 0% than between a grid point of C 100%, M 100%, Y 20%, and K 0% and a grid point of C 100%, M 70%, Y 20%, and K 0%.

As described above, the process shown at the step S105 allows the creation of the CMYK→L*a*b* color conversion LUT having a predetermined number of grid points.

Next, the PC 100 creates an L*a*b*→CMYK color conversion LUT (step S106). Specifically, the PC 100 creates an L*a*b*→CMYK color conversion LUT (a B2A table) from the CMYK→L*a*b* color conversion LUT created by the process shown at the step S105. The technique itself for creating the L*a*b*→CMYK color conversion LUT from the CMYK→L*a*b* color conversion LUT is a typical color conversion LUT creation technique, and thus a detailed description thereof will be omitted.

Then, the PC 100 writes out a printer profile in a predetermined format (step S107) and ends the process. Specifically, the PC 100 writes out the CMYK→L*a*b* color conversion LUT created by the process shown at the step S105 and the L*a*b*→CMYK color conversion LUT created by the process shown at the step S106 in a format conforming to the ICC specification into the data saving unit 650 of the hard disk 140 and ends the process. The printer profile written out into the data saving unit 650 is transmitted to the controller 200*b* and applied to a color conversion process of image data.

As described above, in the process of the flowchart shown in FIG. 6, first, the printer 300*a* is caused to output the plurality of sheets of the color chart 700 to accumulate the data of colorimetric values. Then, with the data of the colorimetric values accumulated, the degree of color variation in each patch image is specified, and according to the degree of color variation, an interpolation calculation method is determined for interpolating the grid points of the color conversion LUT. After that, the printer 300*b* is caused to output only one sheet of the color chart 700 to acquire colorimetric values of the patch images 800. Then, for the color conversion LUT indicating the correspondence between CMYK values of the patch images and the colorimetric values thereof, interpolation process is performed by the interpolation calculation method determined according to the degree of color variation in the patch images 800, thereby creating a printer profile for the printer 300*b*. With this configuration, an average value of color variation can be reflected in grid points added to the color conversion LUT. In other words, merely by causing the printer 300*b* to output one sheet of the color chart, there can be created a printer profile reflecting an average value of color variation.

Hereinafter, a detailed description will be given of the interpolation process of the present embodiment with reference to FIGS. 10 to 12.

Figure 10:
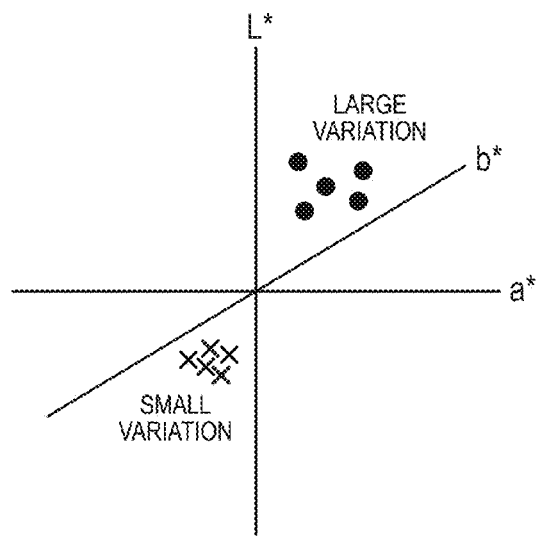
FIG. 10 is a diagram for illustrating the degrees of color variation.

FIG. 10 is a diagram for illustrating the degrees of color variation in an L*a*b* color space. In FIG. 10, five points indicated by circles represent colorimetric values of each patch image in a case where patch images having a color corresponding to first CMYK values were output five times. Similarly, five points indicated by crosses represent colorimetric values of each patch image in a case where patch images having a color corresponding to second CMYK values were output five times.

As shown in FIG. 10, the colorimetric values of the patch images having the color corresponding to the first CMYK values are distributed in a wider range than the colorimetric values of the patch images having the color corresponding to the second CMYK values. In other words, the color corresponding to the first CMYK values varies in a larger degree in each output than the color corresponding to the second CMYK values. In the interpolation process of the present embodiment, the grid points of the color conversion LUT are interpolated in consideration of variation in colors output from the printer.

Figure 11:
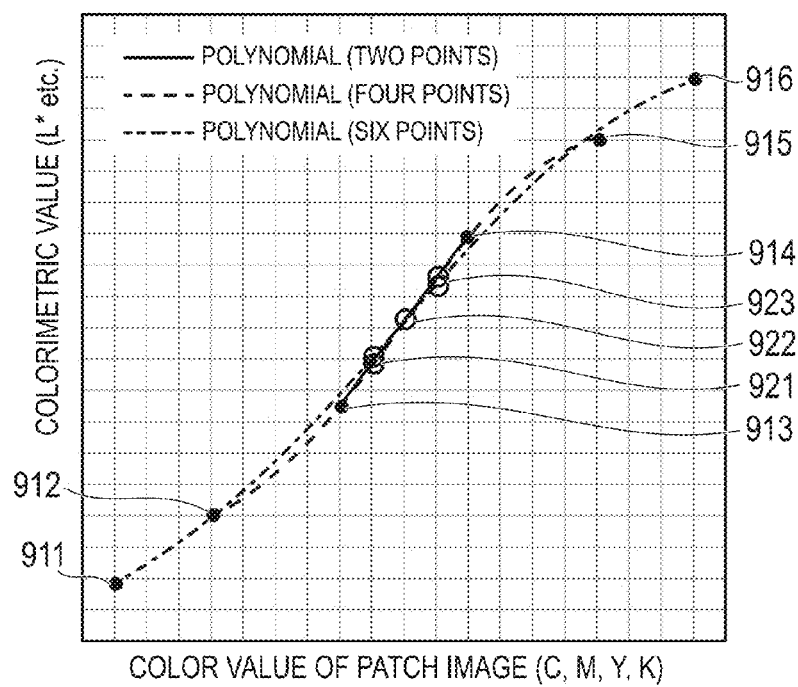
FIG. 11 is a diagram showing a relationship between degree of color variation and number of neighboring points for interpolation calculation.

FIG. 11 is a diagram showing a relationship between degree of color variation and number of neighboring points for interpolation calculation. The vertical axis of FIG. 11 represents colorimetric value and the horizontal axis thereof represents color value of one of the four basic colors: C, M, Y, and K, i.e. of a remaining one in a state where color values of three of C, M, Y, and K are fixed. In FIG. 11, points 911 to 916 indicated by black circles represent grid points where colorimetric values have been acquired. As for FIG. 11, a description will be given of an example of obtaining three grid points 921 to 923 for used in interpolation between gridpoints 913 and 914 adjacent to each other.

As described hereinabove, in the interpolation process of the present embodiment, the number of grid points is changed according to the degree of color variation so that as the degree of color variation in the two patch images corresponding to the pair of grid points is larger, the number of grid points for use in the interpolation calculation increases. Specifically, for example, when the degree of color variation in two patch images corresponding to the pair of grid points 913 and 914 is classified as the above "A", a color value of a grid point 922 is calculated by interpolation calculation using the two grid points 913 and 914. In addition, when the degree of color variation in the two patch images is classified as the above "B", the color value of the grid point 922 is calculated by interpolation calculation using four grid points 912 to 915. Additionally, when the degree of color variation in the two patch images is classified as the above "C", the color value of the grid point 922 is calculated by interpolation calculation using six grid points 911 to 916.

After that, color values of grid points 921 and 923 are calculated using the same number of grid points as the number of the grid points used for the interpolation calculation of the grid point 922. In the present embodiment, the color values of the grid points 921 and 923 are calculated using the plurality of grid points including the grid point 922. However, unlike the present embodiment, the color values of the grid points 921 and 923 may be calculated using the same grid points as those used for the interpolation calculation of the grid point 922.

Figure 12:
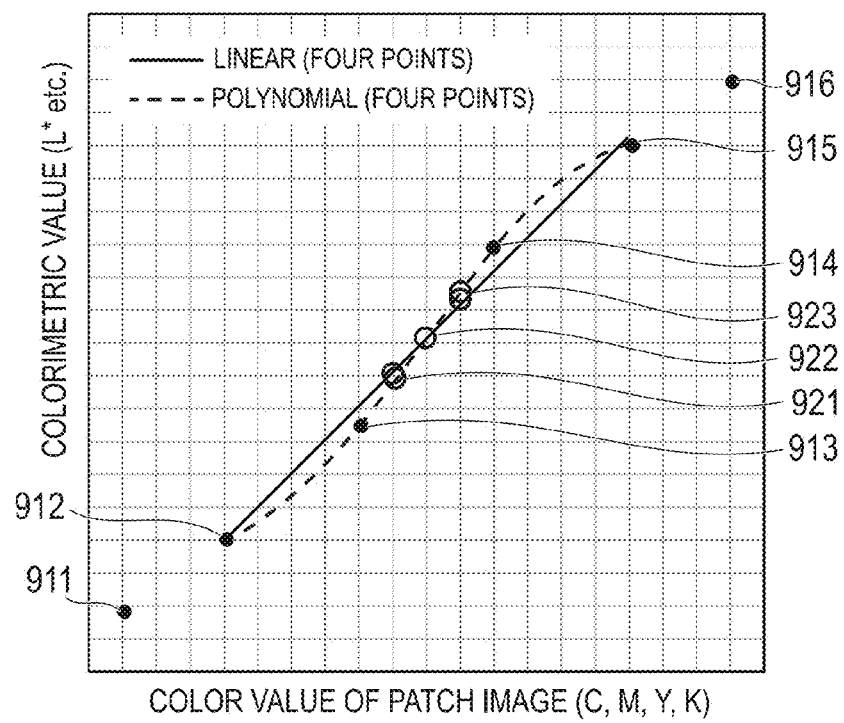
FIG. 12 is a diagram showing a relationship between degree of color variation and weighting factor of linear approximate value.

FIG. 12 is a diagram showing a relationship between degree of color variation and weighting factor of linear approximate value. The vertical axis of FIG. 12 represents colorimetric value and the horizontal axis thereof represents color value of one of the four basic colors: C, M, Y, and K, i.e., of a remaining one in the state where color values of three of C, M, Y, and K are fixed. In FIG. 12, points 911 to 916 indicated by black circles are grid points where colorimetric values have been acquired.

As described hereinabove, in the interpolation process of the present embodiment, the colors values of the grid points 921 to 923 are calculated by calculating a weighted average value between the first approximate value calculated by linear interpolation calculation and the second approximate value calculated by polynomial interpolation calculation. Here, the weighting factor is changed according to the degree of color variation so that as the degree of color variation in the two patch images corresponding to the pair of grid points is larger, the weight of the first approximate value becomes larger.

For example, when the degree of color variation in a pair of patch images corresponding to the pair of grid points 913 and 914 is classified as the above "B", linear interpolation calculation using the four grid points 912 to 915 is performed to calculate a first approximate value of the grid point 922, as shown in FIG. 12. Additionally, polynomial interpolation calculation using the four grid points 912 to 915 is performed to calculate a second approximate value of the grid point 922. Then, a sum of a value obtained by multiplying the first approximate value by 0.5 and a value obtained by multiplying the second approximate value by 0.5 is calculated as the color value of the grid point 922.

As described above, the present embodiment performs the interpolation process of the color conversion LUT so that smoothness is prioritized in colors with a large degree of variation and reproduction accuracy is prioritized in colors with a small degree of variation. With this configuration, an average value of color variation can be reflected in grid points added to the color conversion LUT, while leaving color characteristics specific to the printer 300b.

Even when a third printer of the same model as the printers 300a and 300b is located on the network 500, the data of the colorimetric values in the printer 300a can be used, whereby the third printer is caused to output one sheet of the color chart to similarly allow the creation of a printer profile reflecting an average value of variation per output of each color.

As described above, in the present embodiment, the accumulation of data of calorimetric values of each patch image allows a printer profile reflecting an average value of color variation per output to be created merely by causing a printer to output one sheet of a color chart.

In addition, the above-described embodiment has described the case of creation of a printer profile reflecting color variation per output in printer. The following is a description of a case of creation of a printer profile reflecting color variation per printer.

The creation of a printer profile reflecting color variation per printer uses data of calorimetric values accumulated by causing a plurality of printers to output color charts.

Specifically, for example, when creating a printer profile for an only one printer of a model C, first, 30 printers of a model B structurally similar to the model C are caused to output each one sheet of a color chart. Then, the degree of variation in each color is specified from data of calorimetric values per patch image. After that, the printer of the model C is caused to output one sheet of the color chart, and an interpolation process according to the degree of color variation is performed to interpolate grid points. In this way, an average value of color variation per printer can be reflected in a printer profile while leaving color characteristics specific to the model C. In addition, in this case, weighting of approximate values may be performed using, as an additional factor, a degree of structural similarity associated with color reproducibility in the models B and C.

As described above, by accumulating the data of the colorimetric value of each patch image regarding the plurality of sheets of the color chart output from the plurality of printers of the model B, there can be created a printer profile (for example, a manufacturer-provided profile) for all printers of the model C that reflects variation in individual differences of the similar model merely by causing the single printer of the model C to output one sheet of the color chart.

Causes of the color variation seem to be individual difference between the printers, change due to replacement of parts, density fluctuation in engine (temperature and humidity, continuous operation time, etc.), random in-plane unevenness, and the like. Additionally, as for tendencies in color variation, colors near solid parts tend to vary in a small degree, whereas colors in a region ranging from a highlight part to a halftone part tend to vary in a large degree. Furthermore, monochromatic colors tend to vary in a small degree, whereas mixture colors of three colors: C, M, and Y tend to vary in a large degree.

The present invention is not limited only to the embodiments described above, and various modifications can be made within the scope of the claims.

For example, in the above-described embodiments, the color value of the grid point used for interpolation between the pair of grid points has been calculated as the weighted average value between the first approximate value by the linear interpolation and the second approximate value by the polynomial interpolation. However, the weighted average value between the first approximate value and the second approximate value does not necessarily have to be calculated, and the color value of the grid point used for interpolation between the pair of grid points may be any one of the first approximate value and the second approximate value.

Additionally, in the above-described embodiments, the number of grid points used for the calculation of the first and the second approximate values has been changed according to the degree of color variation. However, the number of the grid points may be constant regardless of the degree of color variation.

Additionally, in the above-described embodiments, the degree of color variation has been classified into the three levels: "a", "b", and "c" from the standard deviations of the colorimetric values of the patch images. Then, the number of the neighboring points and the weighting factor to be applied to the interpolation process have been determined from the degrees of both-side variation of three levels determined by combinations of the three levels: "a", "b", and "c". However, the number of neighboring points and the weighting factor to be applied to the interpolation process may be directly determined from each standard deviation (the degree of color variation) of the two patch images. In this case, in terms of continuously changing the weighting factor, the standard deviations of colorimetric values of the patch images are preferably correlated with the weighting factor by a function.

Additionally, in the above-described embodiments, the degrees of color variation in the patch images have been specified by calculating the standard deviations of the colorimetric values: L* values, a* values, and b* values. However, the degrees of variation may be specified by calculating dispersions of the colorimetric values: L* values, a* values, and b* values or calculating differences between maximum and minimum values.

Additionally, in the above-described embodiments, in terms of facilitation of setting, a threshold value with respect to the sum of the standard deviations of the L* values, the a* values, and the b* values has been set and, based on the threshold value, the degree of color variation in the patch images has been classified into three levels. However, in terms of continuously changing the degree of color variation, the sum of the standard deviations may be correlated with the degree of color variation by a function.

Additionally, in the above-described embodiments, the degree of color variation has been specified by comparing the sum of the standard deviations of the L* values, the a* values, and the b* values with the invariably constant threshold value. However, the threshold value may be dynamically changed by CMYK values. For example, in cases where K is less than 80, when the sum of the standard deviations is less than 1.0, the degree of variation is classified as "a". On the other hand, in cases where K is not less than 80, when the sum of the standard deviations is less than 1.5, the degree of variation is classified as "a".

Additionally, in the above-described embodiments, the plurality of printers have been caused to output the same color chart. However, the color chart to be output by the plurality of printers does not have to be the same and can be any color chart as long as it includes patch images with the same CMYK values.

Additionally, in the above-described embodiments, the L*a*b* color system has been used as a device-independent color space. However, the color system of the device-independent color space is not limited to the L*a*b* color system and may be an XYZ color system, CIECAM02, or the like.

Additionally, in the above-describe embodiments, the data of the colorimetric values and the like have been saved in the hard disk of the PC. However, the data of the colorimetric values and the like may be saved in a server outside the PC.

Additionally, in the above-described embodiments, the colorimeter as an independent device has been connected to the PC via the exclusive line. However, the colorimeter may be incorporated in the printer.

Additionally, in the above-described embodiments, the controllers have been provided separately from the printers. However, the controllers may be incorporated in the printers.

The units and the methods for performing the various kinds of processes in the print system according to each of the above-described embodiments can be embodied by either an exclusive hardware circuit or a programmed computer. The program may be provided, for example, by a computer readable recording medium such as a flexible disk or a CD-ROM, or may be provided online through a network such as the Internet. In this case, the program stored in the computer readable recording medium is usually transferred and stored into a storage unit such as a hard disk. In addition, the program may be provided as independent application software or may be incorporated, as one function of the print system, into software of the device.

What is claimed is:

1. A profile creation method for creating a color conversion profile for a printer, comprising:
   printing, by at least one printer, a plurality of color charts each including patch images having colors corresponding to combinations of values of a plurality of basic colors, wherein each of the plural color charts includes at least two patch images which have identical color values, respectively, as patch images on the other color charts;
   in a processor:
      calculating, based upon colorimetric values for the patch images, an amount of color variation among at least two patch images having the identical color value on the plural color charts;
      selecting an interpolation method from among a plurality of different interpolation methods, the selection being based upon the calculated amount of color variation;
      extracting a pair of grid points adjacent to each other from among grid points of a lookup table indicating a correspondence relationship between the values of the colors of the patch images and colorimetric values of the patch images;
      performing an interpolation process according to the selected interpolation method, to obtain a grid point for interpolation between the pair of grid points,
      creating a color conversion table based upon said obtained grid point; and
   controlling the output of the printer in accordance with the color conversion table.

2. The profile creation method as claimed in claim 1, wherein
   the interpolation process is a process involving an interpolation calculation using a plurality of grid points, and
   a number of the plurality of grid points for use in the interpolation calculation is changed according to the amount of the variation so that as the amount of the variation is larger, the number of the plurality of grid points increases.

3. The profile creation method as claimed in claim 1, wherein
   the interpolation process is a process for calculating a weighted average value between a first approximate value calculated by a linear interpolation calculation using a plurality of grid points and a second approximate value calculated by a polynomial interpolation calculation using a plurality of grid points, and a weighting factor for use in the calculation of the weighted average value is changed according to the amount of the variation so that as the amount of the variation is larger, a weight of the first approximate value becomes larger.

4. The profile creation method as claimed in claim 1, further comprising the steps of, before the step of performing an interpolation process:

calculating, from the data of the colorimetric value, standard deviations of L* value, a* value, and b* value of the colorimetric value in an L*a*b* color system; and obtaining the amount of the variation on the basis of the standard deviations.

5. The profile creation method as claimed in claim 1, wherein the step of extracting a pair of grid points and the step of performing an interpolation process are executed regarding a plurality of pairs of grid points included in the lookup table, and regarding the plurality of pairs of grid points, the interpolation process is performed in a sequential order of pairs of grid points corresponding to ridgelines, pairs of grid points corresponding to a surface other than the ridgelines, and pairs of grid points corresponding to an inside of a color space whose axis variables are represented by the basic colors.

6. The profile creation method as claimed in claim 5, wherein regarding the pairs of grid points for which the interpolation process is performed at a same priority level of the sequential order, the interpolation process is performed preferentially starting from a pair of grid points included in an array of grid points where a value of a basic color whose monochromatic solid image has lower brightness gradually changes.

7. A non-transitory computer readable recording medium stored with a profile creation program for creating a color conversion profile for a printer, the program causing a computer to execute a process comprising the steps of:

receiving colorimetric values for a plurality of color charts printed by at least one printer, each color chart including patch images having colors corresponding to combinations of values of a plurality of basic colors, wherein each of the plural color charts includes at least two patch images which have identical color values, respectively, as patch images on the other color charts;

calculating, based upon colorimetric values for the patch images, an amount of color variation among at least two patch images having the identical color value on the plural color charts;

selecting an interpolation method from among a plurality of different interpolation methods, the selection being based upon the calculated amount of color variation;

extracting a pair of grid points adjacent to each other from among grid points of a lookup table indicating a correspondence relationship between the values of the colors of the patch images and colorimetric values of the patch images;

performing an interpolation process according to the selected interpolation method, to obtain a grid point for interpolation between the pair of grid points, creating a color conversion table based upon said obtained grid point; and providing the color conversion table to the printer, to control the output of the printer in accordance with the color conversion table.

8. The non-transitory computer readable recording medium as claimed in claim 7, wherein the interpolation process is a process involving an interpolation calculation using a plurality of grid points, and a number of the plurality of grid points for use in the interpolation calculation is changed according to the amount of the variation so that as the amount of the variation is larger, the number of the plurality of grid points increases.

9. The non-transitory computer readable recording medium as claimed in claim 7, wherein the interpolation process is a process for calculating a weighted average value between a first approximate value calculated by a linear interpolation calculation using a plurality of grid points and a second approximate value calculated by a polynomial interpolation calculation using a plurality of grid points, and a weighting factor for use in the calculation of the weighted average value is changed according to the amount of the variation so that as the amount of the variation is larger, a weight of the first approximate value becomes larger.

10. The non-transitory computer readable recording medium as claimed in claim 7, wherein the process further comprises the steps of, before the step of performing an interpolation process:

calculating, from the data of the colorimetric value, standard deviations of L* value, a* value, and b* value of the colorimetric value in an L*a*b* color system; and obtaining the amount of the variation on the basis of the standard deviations.

11. The non-transitory computer readable recording medium as claimed in claim 7, wherein the step of extracting a pair of grid points and the step of performing an interpolation process are executed regarding a plurality of pairs of grid points included in the lookup table, and regarding the plurality of pairs of grid points, the interpolation process is performed in a sequential order of pairs of grid points corresponding to ridgelines, pairs of grid points corresponding to a surface other than the ridgelines, and pairs of grid points corresponding to an inside of a color space whose axis variables are represented by the basic colors.

12. The non-transitory computer readable recording medium as claimed in claim 11, wherein regarding the pairs of grid points for which the interpolation process is performed at a same priority level of the sequential order, the interpolation process is performed preferentially starting from a pair of grid points included in an array of grid points where a value of a basic color whose monochromatic solid image has lower brightness gradually changes.

13. The profile creation method as claimed in claim 1, wherein the plurality of color charts are printed by one printer.

14. The profile creation method as claimed in claim 1, wherein the plurality of color charts are printed by a plurality of printers.

15. The non-transitory computer readable recording medium as claimed in claim 7, wherein the plurality of color charts are printed by one printer.

16. The non-transitory computer readable recording medium as claimed in claim 7, wherein the plurality of color charts are printed by a plurality of printers.

\* \* \* \* \*